(12) United States Patent
Rourke et al.

(10) Patent No.: US 11,207,892 B2
(45) Date of Patent: Dec. 28, 2021

(54) REPLACEABLE PRINT APPARATUS COMPONENTS COMPRISING MEMORY

(71) Applicant: HEWLETT-PACKARD DEVELOPMENT COMPANY, L.P., Spring, TX (US)

(72) Inventors: Kevin Rourke, Leixlip (IE); John McNeilly, Leixlip (IE); Jefferson P Ward, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/606,017

(22) PCT Filed: Oct. 18, 2017

(86) PCT No.: PCT/US2017/057172
§ 371 (c)(1),
(2) Date: Oct. 17, 2019

(87) PCT Pub. No.: WO2019/078847
PCT Pub. Date: Apr. 25, 2019

(65) Prior Publication Data
US 2020/0238720 A1    Jul. 30, 2020

(51) Int. Cl.
*B41J 2/175* (2006.01)
*G03G 21/18* (2006.01)

(52) U.S. Cl.
CPC ...... *B41J 2/17546* (2013.01); *G03G 21/1892* (2013.01); *G03G 21/1896* (2013.01)

(58) Field of Classification Search
CPC ............. B41J 2/17543; B41J 2/17546; G03G 21/1878; G03G 21/1892; G03G 21/1896
See application file for complete search history.

(56) References Cited

U.S. PATENT DOCUMENTS

| 5,187,498 A | 2/1993 | Burger |
| 5,788,388 A | 8/1998 | Cowger et al. |
| 6,431,670 B1 | 8/2002 | Schantz et al. |

(Continued)

FOREIGN PATENT DOCUMENTS

| CN | 1460842 | 12/2003 |
| CN | 1488509 | 4/2004 |

(Continued)

OTHER PUBLICATIONS

Vibrating Fork Liquid Level Switch, Dec. 28, 2016, http://www.levelsensor.in/vibrating-fork-liquid-level-switch.html.

*Primary Examiner* — Matthew Luu
*Assistant Examiner* — Kendrick X Liu
(74) *Attorney, Agent, or Firm* — Trop Pruner & Hu PC

(57) ABSTRACT

In an example, a method comprises fabricating a first validation device for association with a first replaceable print apparatus component. The device may be to form part of circuitry arranged on the first replaceable print apparatus component, and may provide an associated electrically detectable characteristic which varies with the position of at least part of the first validation device. The electrically detectable characteristic may be measured and data indicative of the characteristic may be stored in a first memory. The first replaceable print apparatus component comprising the first device and the first memory may be assembled.

18 Claims, 6 Drawing Sheets

(56) References Cited

U.S. PATENT DOCUMENTS

| | | |
|---|---|---|
| 7,331,645 B2 | 2/2008 | Nishihara |
| 7,542,698 B2 | 6/2009 | Burchette et al. |
| 7,556,326 B2 | 7/2009 | Knierim et al. |
| 9,542,576 B1 * | 1/2017 | Ahne ................. G03G 21/1892 |
| 2003/0071862 A1 | 4/2003 | Tsukada et al. |
| 2008/0279373 A1 | 11/2008 | Erhart |
| 2013/0083096 A1 | 4/2013 | Rice |
| 2013/0118254 A1 | 5/2013 | Urban et al. |
| 2014/0085363 A1 | 3/2014 | Brocklin et al. |
| 2014/0211241 A1 | 7/2014 | Rice |
| 2015/0362860 A1 * | 12/2015 | Anderson .......... G03G 15/0865 |
| | | 399/272 |
| 2016/0229179 A1 | 8/2016 | Anderson et al. |
| 2016/0339696 A1 | 11/2016 | Ge et al. |

FOREIGN PATENT DOCUMENTS

| | | |
|---|---|---|
| CN | 1621959 | 6/2005 |
| CN | 1663800 | 9/2005 |
| CN | 102442074 | 5/2012 |
| CN | 103038612 | 4/2013 |
| JP | 2007093456 | 4/2007 |

* cited by examiner

REPLACEABLE PRINT APPARATUS COMPONENTS COMPRISING MEMORY

BACKGROUND

Print apparatus may include one or more replaceable print apparatus components, for example print agent cartridges (e.g. ink or toner cartridges), printhead assemblies and the like. In some examples, such replaceable print apparatus components are provided with memory to communicate information to a print apparatus. In some examples, the memory comprises authentication information to allow the print apparatus component to be validated. Such validation may be used to authenticate the source of a replaceable print apparatus component, and thereby enhance a user's experience in terms of the reliability, print quality and the like.

BRIEF DESCRIPTION OF THE DRAWINGS

Non-limiting examples will now be described with reference to the accompanying drawings, in which.

DETAILED DESCRIPTION

In some examples, authentication apparatus for replaceable print apparatus components may utilise a measurement of a physical device provided on the print apparatus component. For example, an electrical measurement of the device can provide the basis of an authentication value. A memory may be provided with the replaceable print apparatus component, and may store (in some examples in a format such that the authenticity of the data is apparent and/or verifiable) characteristics of the device. Once the replaceable print apparatus component is installed in a print apparatus, an electrical test of the device may be carried out and the result of this test may be compared to an authentication value stored in the memory.

Figure 1:
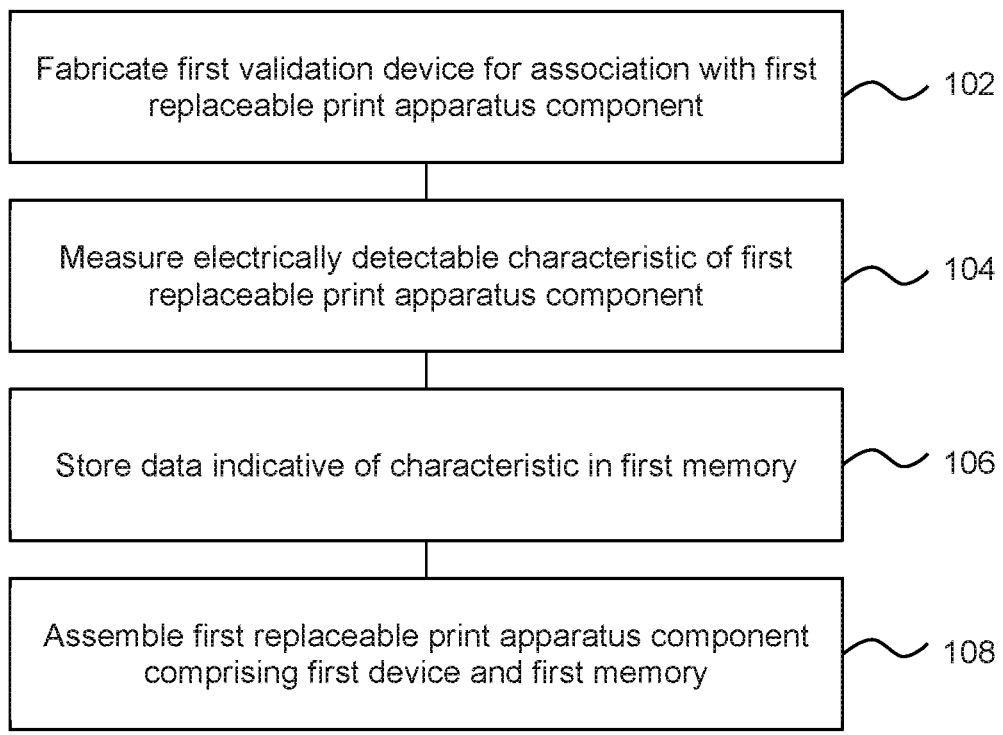
FIG. 1 is an example of a method of fabricating replaceable print apparatus components.

FIG. 1 is an example of a method, which may be a method of fabricating replaceable print apparatus components.

Block 102 comprises fabricating a first validation device for association with a first replaceable print apparatus component, wherein the device is to form part of circuitry arranged on the first replaceable print apparatus component and provides an associated electrically detectable characteristic which varies with the position of at least part of the first validation device. The circuitry arranged on the first replaceable print apparatus component in the sense of being provided in or comprising part of the first replaceable print apparatus component.

For example, as set out in greater detail below, the validation device may comprise a vibrating or oscillating member having characteristic resonant behaviour and/or which responds to a physical stimulus in a characteristic manner.

In some examples, the validation device may be provided inside a housing of a replaceable print apparatus component and at least some portions of the circuitry may be provided on (for example, outside) the housing of the replaceable print apparatus component. In some such examples, the validation device or a portion thereof may be capacitively coupled to the portion of the circuitry which is outside the housing.

Block 104 comprises measuring the electrically detectable characteristic of the first replaceable print apparatus component. In some examples, measuring the electrically detectable characteristic may comprise determining a capacitance of the circuit and/or electrical parameters associated with a varying capacitance (for example, voltage and current parameters). The capacitance of a circuit is dependent, at least in part, on the separation of capacitive plates within the circuit. In examples in which the first validation device comprises one capacitive plate and a second capacitive plate of a capacitor is mounted on another portion of the print apparatus component (for example, on a housing of the print apparatus component), the capacitance of the circuit may vary in response to displacement of at least part of the validation device.

For example, if the validation device comprises a vibrating or oscillating member, if a stimulus is applied to cause resonant vibration or oscillation thereof and the member is free to move (for example, is in air), there may be a variance in capacitance at the resonant or 'natural' frequency. Thus, the resonant frequency of the validation device is detectable by measuring the change in capacitance. In addition, other characteristics of the validation device, such as a decay rate of vibration may also be determined by measurement of the capacitance or electrical parameters associated therewith (for example, voltage and current parameters). However, if the validation device if for example submerged in a liquid, it may exhibit different behaviour, for example being driven at the speed of the liquid movement. Thus the validation device may in some examples act as a fluid level sensor.

In still further examples, rather than being a changing capacitance, the validation device may induce a signal, for example by inductance, into another portion of the circuitry. Such a change may also be indicative of the displacement of at least part of the validation device.

Block 106 comprises storing data indicative of the characteristic in the first memory. For example, this may comprise a frequency of variation in the capacitance/inductance (which may be indicative of a resonant frequency of the validation device in some examples), a decay rate of the magnitude of a change in capacitance/inductance, a range in capacitance/inductance during a particular stimulus, or the like.

Block 108 comprises assembling the first replaceable print apparatus component comprising the first validation device and the first memory.

While in the flow chart of FIG. 1, block 108 follows blocks 104 and 106, this may not be the case in all examples. In some examples, at least one measurement may take place when the first device and/or the memory is in situ within the print apparatus component. In some examples, at least one measurement may take place prior to installation of at least one of the first device and the first memory in the print apparatus component and at least one measurement may take place following installation of at least one of the first device and the first memory in the print apparatus component.

By measuring the electrical characteristics and storing them for association with the print apparatus component comprising the device, any variability in manufacture of the device is accounted for. The method also provides a pair of features for use together invalidating the component: the print apparatus component comprises a memory and a validation device matching the data stored in the memory.

Figure 2:
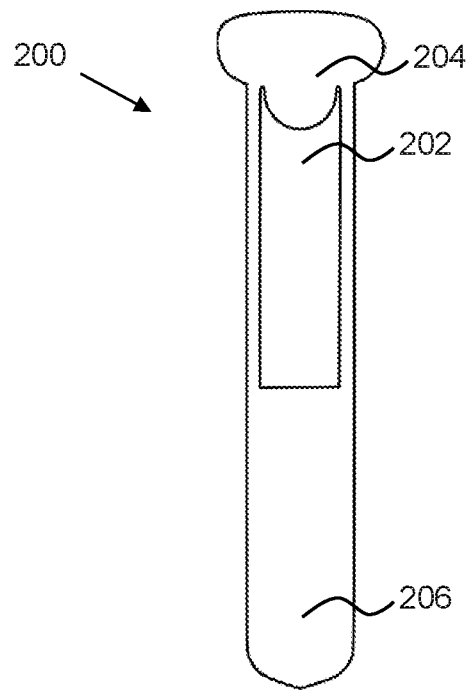
FIG. 2 is an example of a validation device.

FIG. 2 shows an example of a validation device 200, in this example comprising a resonant member.

The validation device 200 in this example comprises a planar longitudinal member having a cut-out portion 202 between a mounting point 204 and a distal portion 206. However, in other examples, a resonant member of a validation device 200 may comprise a coiled spring or the like. The cut-out portion 202 provides a region of relatively high flexibility of the device 200, meaning that the displacement of the distal portion 206 under a given stimulus may be greater than it would be absent the cut-out 202. In other examples, this may be provided by narrowing the material in a region of the device 200 proximal to the mounting point 204, selecting a more flexible material for a region, or there may be no region of increased flexibility.

The vibrational behaviour of such a validation device (e.g. magnitude of response, magnitude of stimulus to provide a response, resonant frequency, decay rate of vibration, etc.) may be affected by varying a physical characteristic such as any or any combination of varying a length of the first validation device, varying a material of at least part of the first validation device; varying a width of the first validation device; adding a mass at a given location, determining a size/presence of the cut-out portion in the first validation device, and the like.

In some examples, such physical characteristics may be varied between instances of a validation device resulting in variations of the vibrational behaviour and/or electrical response to an electrical query of the device 200 between the instances.

Where such a validation device 200 is provided in a print apparatus component, it may be fixed to the component at the mounting point 204, whereas the distal portion 206 may be free to move. The presence of the device 200 and/or the nature of the movement of the distal portion 206 may be used to validate the component.

For example, a print apparatus may comprise validation circuitry which may electrically 'query' the device 200 and compare the response to an expected response held in a memory of the print apparatus component comprising the device (which may be measured and stored as described in relation to blocks 104 and 106 above).

Such validation may comprise one or various processes. For example, the presence of the device 200 may be detected by determining if the capacitance of a circuit comprising the device 200 corresponds to an expected capacitance. It may be noted that the physical characteristics may affect the expected capacitance (for example, the dimensions and materials of any portion of the device 200 which provides a capacitive plate, such as the distal portion 206 in some examples), as well as in some examples the shape: the planar longitudinal member may be bent such that the mounting point 204 and the distal portion 206 are not aligned, for example such that when the mounting point 204 is fixed to a wall of a print apparatus component, the distal portion 206 may be spaced from the wall and free to move. The spacing distance will affect capacitance.

If more than one device 200 is expected to be present in the print apparatus, the presence of all expected devices may be validated. In another example, the response of the device 200 to a stimulus may be determined and compared to the expected response. The expected response may depend on a status of the component (for example, if the component is a new print agent component, it may be expected to be full, and thus the device 200 may be expected to respond as if submerged in a fluid, rather than free to move in air).

A stimulus applied may take various forms during validation. For example, an impulse, or sudden force, may be applied by causing a moving component containing the device 200 to rapidly decelerate, for example by stopping a carriage housing the component (which may be a print apparatus component) suddenly, or by causing the carriage to knock against a stopping member. In other examples, an external device, such as an electromagnet, may be used to generate an impulse force, by generating a magnetic field to act on the distal portion 206 of the device 200 then removing the magnetic field, to cause the distal portion 206 to oscillate as it returns to a resting position.

Another way of causing movement of the distal portion 206 of the device 200 is to cause movement of the device 200 at a defined driving frequency. In some examples, a direction of movement of a print apparatus container may rapidly and repeatedly be reversed. Such movement may be referred to as cyclic movement. For example, a mechanism for causing a carriage to move within a printing apparatus may cause a fluid container such as a print agent cartridge to move backwards and forwards, for example along a track, at a defined frequency. Fluid, such as print agent within a fluid container, may be caused to slosh from one side of the fluid container to an opposite side of the fluid container at the same defined frequency. The moving liquid may cause the free arm or arms of the device to oscillate at the same frequency. All of these methods may cause displacement, or movement, of at least part of the device 200.

The position of the distal portion 206 may be monitored capacitively as described above. For example, the distal portion 206 may function as (if the device 200 is conductive), or may comprise, a capacitive plate, and another capacitive plate may be mounted on a surface of the print apparatus component and the capacitance may be monitored via circuitry (which may for example be provided as part of the print apparatus). For example, an impulse may be applied and the capacitance of the circuit may change at a rate corresponding to a characteristic wavelength of fluid with the container if the device 200 is submerged in fluid, or at the resonant or natural frequency of the device 200 if the distal portion 206 is in air. This may be compared to an expected response to determine if the device 200 and an associated memory are matched.

In some examples, measurement of electrically detectable characteristic(s) of first replaceable print apparatus component as described in relation to block 104 above may mimic or recreate a stimulus and/or condition (e.g. whether the device 200 is submerged or in air) which may be to validate the print apparatus component when installed in print apparatus. Different measurements may be carried out corresponding to different stimuli and/or conditions.

In some examples, data stored in the memory may be indicative of, for example, the number of validation devices in a print apparatus component, mounting orientation of each validation device, the resonant frequency of each validation device and/or the decay of a signal, the size and/or number of stimuli or stimulus cycles required to detect each validation devices, information associated with fluid level (such as the amount of print agent provided in the component during manufacture and/or the amount of print agent that needs to be depleted from the component, for the or each vibrating member, to uncover that member).

Figure 3:
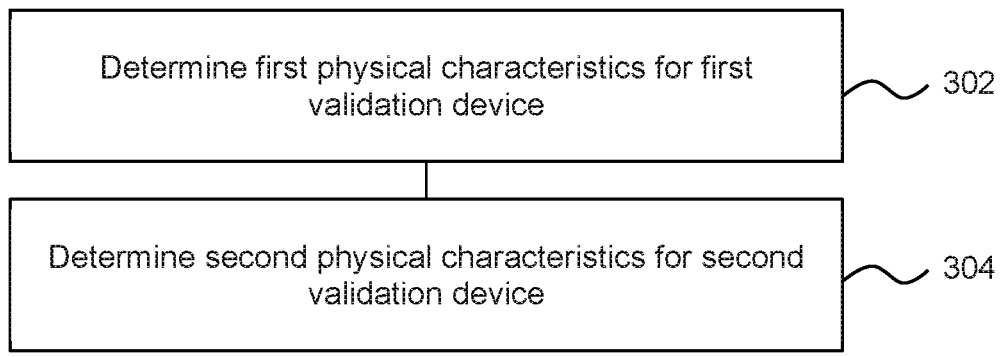
FIG. 3 is an example of a method of determining physical characteristics for validation devices.

FIG. 3 is an example of a method which comprises, in block 302, determining first physical characteristics for a first validation device. Block 304 comprises determining second physical characteristics for a second validation device, wherein the second physical characteristics are different from the first physical characteristics.

In other words, in some examples, the validation devices are not 'mass manufactured' to have substantially identical physical features. In some examples, this may comprise allowing a relatively wide tolerance within machining apparatus. In other examples, a validation device may be manufactured, then altered. In other examples, physical characteristics may be predetermined and selected for a given validation device. As noted above, this may impact the response of the device to a stimulus and/or the detectable electrical characteristics such as an expected capacitance even in the absence of a stimulus.

FIGS. 4A-D provide examples of validation devices.

Figure 4A:
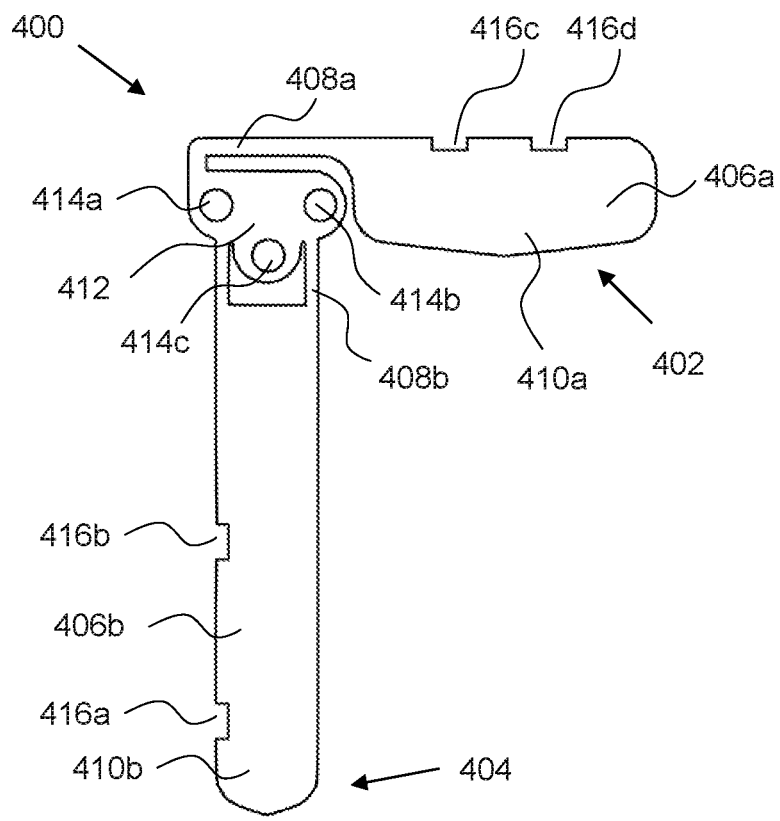
FIGS. 4A-D show examples of validation devices.

FIG. 4A is an example of a validation device comprising a fluid level sensor 400. The sensor 400 in this example comprises two vibrating members which are mounted at relatively offset angles. In this example, the vibrating members comprise a first substantially horizontal arm 402 and a second substantially vertical arm 404. While in this example, the arms are substantially orthogonal to one another, this may not be the case in all examples. However, it may be noted that the illustrated design has advantages in nesting in raw material, for example if the sensor 400 is formed using a stamping process. Each of the arms 402, 404 comprises a distal portion 406a, 406b and a proximal portion 408a, 408b. In each case, the proximal portion 408a, 408b has a first solid surface area per unit length and the distal portion 406a, 406b has a second solid surface area per unit length, wherein the second solid surface area is greater than the first solid surface area. In other words, the distal portions 406 present a greater surface area against which fluid may act per unit length and/or the proximal portions 408 may be more flexible than the distal portions 406.

In the illustrated example, the horizontal arm 402 achieves this reduction in solid surface area by having a narrow section forming the proximal portion 408a (i.e., the proximal portion 408a has a first width and the distal portion 406a has a second width, the second width being greater than the first width), whereas the vertical arm 404 achieves reduction in solid surface area by having a cut-out section formed in the proximal portion 408b. In other examples, a portion of a more flexible material may be used.

The distal portions 406, with their relatively high surface area per unit length, form vibrational paddles 410a, 410b.

It may be noted that the length of such a proximal portion 408, or the amount of material cut-out therefrom, will have an effect on the vibrational behaviour of that arm 402, 404. Providing portions of reduced surface area may increase signal strength by increasing flexibility. By providing a cut-out rather than a narrowed portion, there may be increased handling robustness in manufacture as the proximal portion 408 is supported on both sides. In addition, this may assist in reducing torsional and/or longitudinal cross talk.

It may be noted that, by providing a plurality of vibrational paddles 410a, 410b, a fluid level may be sensed at various heights using a single sensor 400. For example, it may be determined when paddle 410a on the horizontal arm 402 becomes uncovered a fluid level in a container containing the sensor 400 reduces, as that paddle 410a may then respond at its natural or resonant frequency when simulated (which response is damped when the paddle 410a is submerged). Subsequently, it may be determined when the lower paddle 410b on the vertical arm 404 is uncovered in the same manner. In some examples, detection may be carried out using a capacitive sensor, wherein the paddles 410 provide first plates of a capacitor and a second plate is mounted at a location spaced therefrom, but capacitively coupled thereto, for example being mounted on the interior or exterior of a housing of a fluid container.

In this example, the fluid level sensor 400 may comprise a stamped spring plate. By stamping the fluid level sensor 400, it may be formed without requiring joints, hinges or the like.

In this example, the fluid sensor 400 comprises a mounting point 412, which in this example comprises a plurality of fixing points 414a, 414b, 414c. By providing a plurality of fixing points 414, the position of the sensor 400 within a container may be readily constrained.

It may be noted that, in this example, the fixing points 414a, 414b, 414c are relatively spaced to provide a solid region there between. This solid region may allow the fitting of additional components. In some examples, this may allow a vacuum cup to contact the solid region for a 'pick and place' operation during manufacture, although this need not be provided in all embodiments.

In this example, it may be noted that the horizontal arm 402 overreaches the vertical arm 404 and the mounting point 412. This in effect allows the horizontal arm 402 to be longer without increasing the overall footprint of the sensor 400. The width of the continuous material forming the link between the arms 402, 404 may be selected so as to provide an intended frequency. It may be noted that the width of this portion may be altered without changing the outer envelope of the sensor 400.

In this example, it may be noted that the vibrational paddles 410a, 410b formed in the distal portions of the fluid level sensor 400 comprise rounded corners. This may assist in limiting damage to any other components which the fluid level sensor 400 may come into contact with.

In this example, the arms 402, 404 each comprise a plurality of attachment points 416a-d for mounting a removable mass. For example, the mass may comprise a clamshell mass.

Adding a mass to a particular attachment point 416 may change the resonant behavior of the sensor 400. By providing attachment points 416 in such positions, the repeatable placement of an added mass is facilitated. In this example, attachment points 416 comprise notches formed on the edges of the arms 402, 404. However, in other examples, these may comprise any feature which allows a mass to be attached at a particular location, for example comprising a cut-out, protrusion or the like.

In one example, the thickness of each arm 402, 404 may be around 0.5 mm to 4 mm. The length of each arm 402, 404 may be on the order of 4 to 5 mm, or up to a few centimeters.

In some examples, different instances of the fluid level sensor 400 may comprise different dimensions which may vary within a predetermined range. This may result in different instances of the sensor 400 having different vibrational behavior and/or providing different electrical responses. The thickness, length and/or width of each arm may vary between different instances. It may be noted that stiffness is a function of the thickness of each arm 402, 404 to the third power but a function of the width of each arm 402, 404 to the first power, meaning that varying the width may 'fine tune' vibrational performance.

In some examples, a dimension of the narrow section of the horizontal arm 402 and/or the cut-out portion of the vertical arm may be varied, again resulting in changes to the resonant frequency. In some examples, at least a portion of a fabricated (for example, stamped) sensor 400 may be altered, for example using laser etching or the like.

In some examples, the material from which the sensor 400 is fabricated, and/or properties thereof, may be different for different instances of the sensor 400, at least in part thereof. In this way, by adapting the geometry and/or materials from which the sensor 400 is made, the resonant frequency may be affected such that the sensor 400 exhibits characteristic behaviour. Such behaviour may be stored on the associated memory and thus the sensor 400 itself and the content of the memory associated it with can become characteristic of the print apparatus component in which it is installed.

Figure 4B:
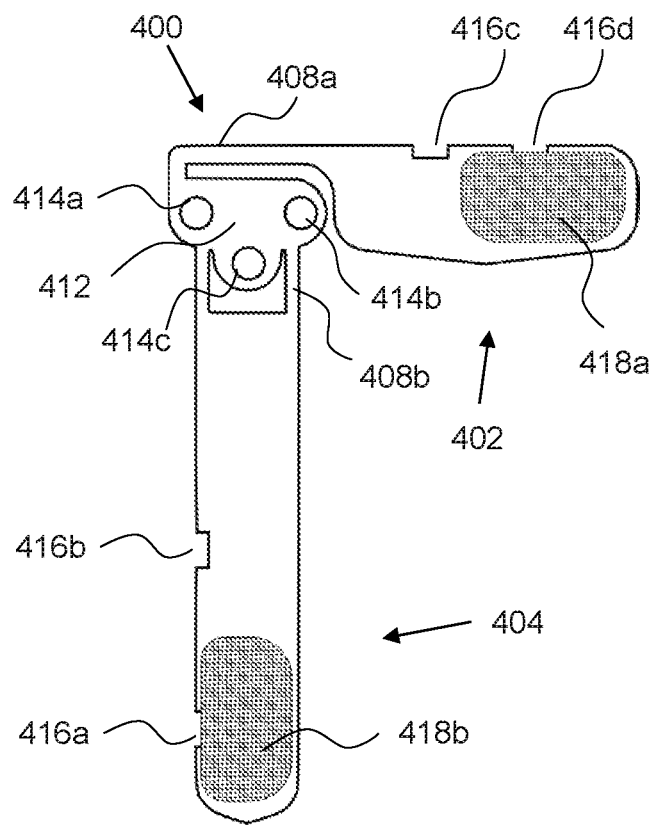

An example of a sensor 400 comprising two such masses 418a, 418b is shown in FIG. 4B.

In this example, it may be the case that both arms 402, 404 exhibit substantially the same resonant frequency, depending on the placement of the masses 418. For example, if the masses 418 are mounted at the inner position, the natural or resonant frequency of both arms may be around 30 to 40 Hz, whereas if the masses 418 are mounted at the outer position on each arm (as shown in the Figures), that arm may exhibit a natural or resonant frequency at between 40 and 50 Hz. In some examples, the masses 418 may for example be, or vary between, around 0.2 to 0.5 g. For example, this may allow selection of a first arm to vibrate at a first frequency and the second arm to vibrate at a second frequency, but these frequencies may be switched to the alternative arm between different instances of the sensors.

In examples in which the arms 402, 404 have different natural or resonant frequencies, the response of the arms 402, 404 may be readily distinguishable even when the arms 402, 404 are connected in series to a single sensing circuit, as the response will have characteristics of both frequencies. In other examples, the arms 402, 404 may have the same response, and the strength of the response signal could be utilized to determine if just one or both arms 402, 404 was responding at its resonant frequency. In other examples, each arm may be monitored individually.

In some examples, the arms 402, 404 may have a resonant vibrational frequency on the order of 10 to 100 Hz. This is within the range of frequencies that may be readily fabricated using stainless steel flat springs with dimensions suitable for inclusion in print apparatus, and detection apparatus (for example, analogue to digital converters) which are sensitive to this range are readily available. In addition, it may be noted that arms 402, 404 with higher resonant frequencies have lower displacement for the same quantity of input energy and therefore the movement of the arms 402, 404 becomes more difficult to detect with increasing resonant frequency. Moreover, higher frequencies are associated with higher sampling rates in order to accurately characterise the oscillation. Higher sampling rates in turn consume greater monitoring and processing resource.

The lower end of the frequency range may be associated with the size of the arms 402, 404 (which may in turn be limited by the size of a print apparatus component). Thus, with different processing and/or size constraints, different frequency ranges may be appropriate.

In some examples, frequencies around national power supply frequencies (for example, around 50 Hz and 60 Hz in most countries) may be avoided in designing devices 200, 400, as this can result in a false reading due to the power supply signal.

Thus, by selecting the mounting position of the masses, the vibrational frequency of each arm 402, 404 may be affected. Such a variation in placement may be combined with any of the variations to the shape and/or materials described above, and/or with use of different masses.

While examples utilising one and two vibrating elements have been described above, in principle any number of vibrating elements could be provided on any number of devices 200, 400, and may differ in properties as described above.

Figure 4C:
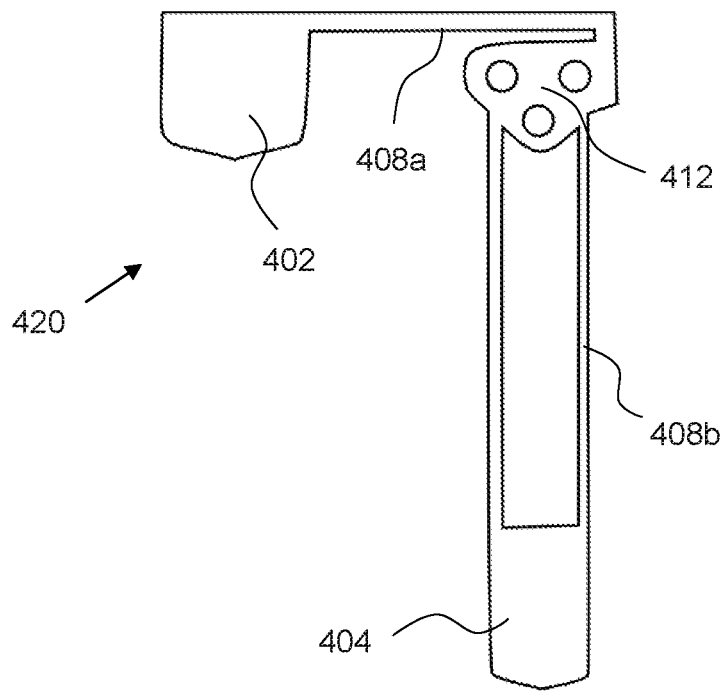

FIG. 4C shows another example of a fluid level sensor 420, in this case comprising two arms 402, 404 as described above. However, it may be noted that, in this example, the narrow proximal portions 408a, 408b of the arms 402, 404 are relatively long, which may alter the vibrational characteristics, as well as the strength of the component.

Figure 4D:
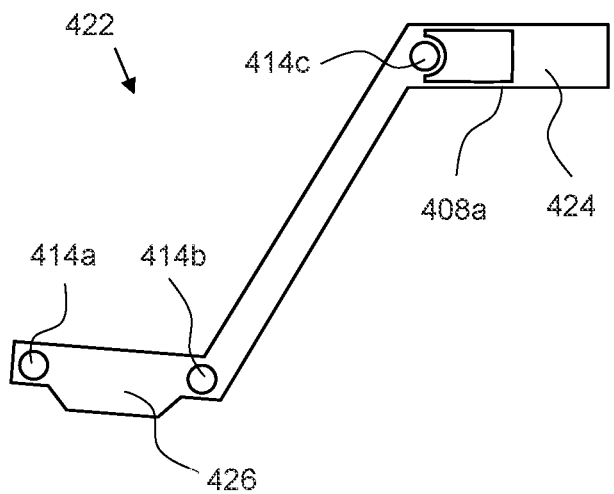

FIG. 4D shows an example of a 'Z-shaped' sensor 422, comprising a vibrating arm 424 and a fixed plate 426, which in use of the sensor may be fixed at a predetermined distance from a second capacitive plate, to which it may be capacitively coupled. The second capacitive plate may be electrically coupled to a sensing apparatus, which may sense the changes in capacitance associated with a change in the dielectric therebetween from liquid when submerged in a print agent to air when the print agent level falls below the level of the fixed plate 426. The tapered shape of the fixed plate 426 may assist in discerning dropping fluid levels. The motion of the end of the vibrating arm 424 may be sensed as described above, for example capacitively.

Figure 4E:
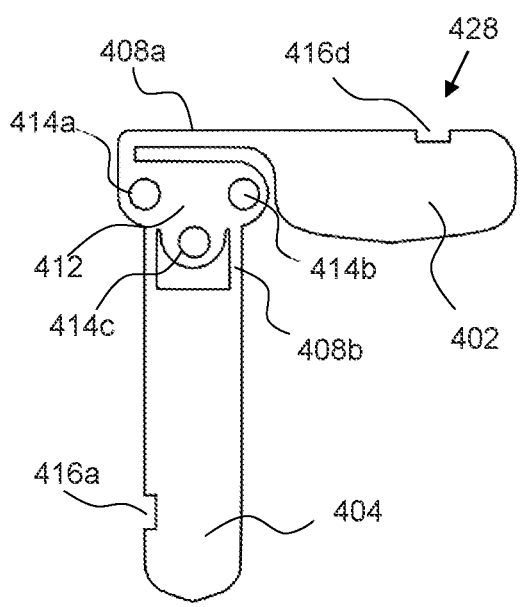

FIG. 4E shows an example of a sensor 428 comprising relatively short arms. Shorter arms provide increased overall robustness and reduce chance of entanglement of tuning forks if they were being fed in to a vibratory feeder or similar (because another tuning fork can no longer fit into the recess). By providing shorter arms, the vibrational frequency may increase, reducing a minimum sampling rate to correctly characterize the movement of the sensor. Masses may optionally be fitted at the mounting points 416a, 416b.

While examples herein describe one or two vibrating elements, there may be any number of vibrating elements and/or sensors 400, 420, 422, 428 installed in a replaceable print apparatus component.

By including different designs of validation device in different instances of a print apparatus components, there may be additional variability to the variability to a particular design.

It may be appreciated that the illustrated examples provides just some examples of the design options available, and many variations on these designs or combinations of features of different designs could be made.

For each validation device, the method of FIG. 1 may be followed.

Figure 5:
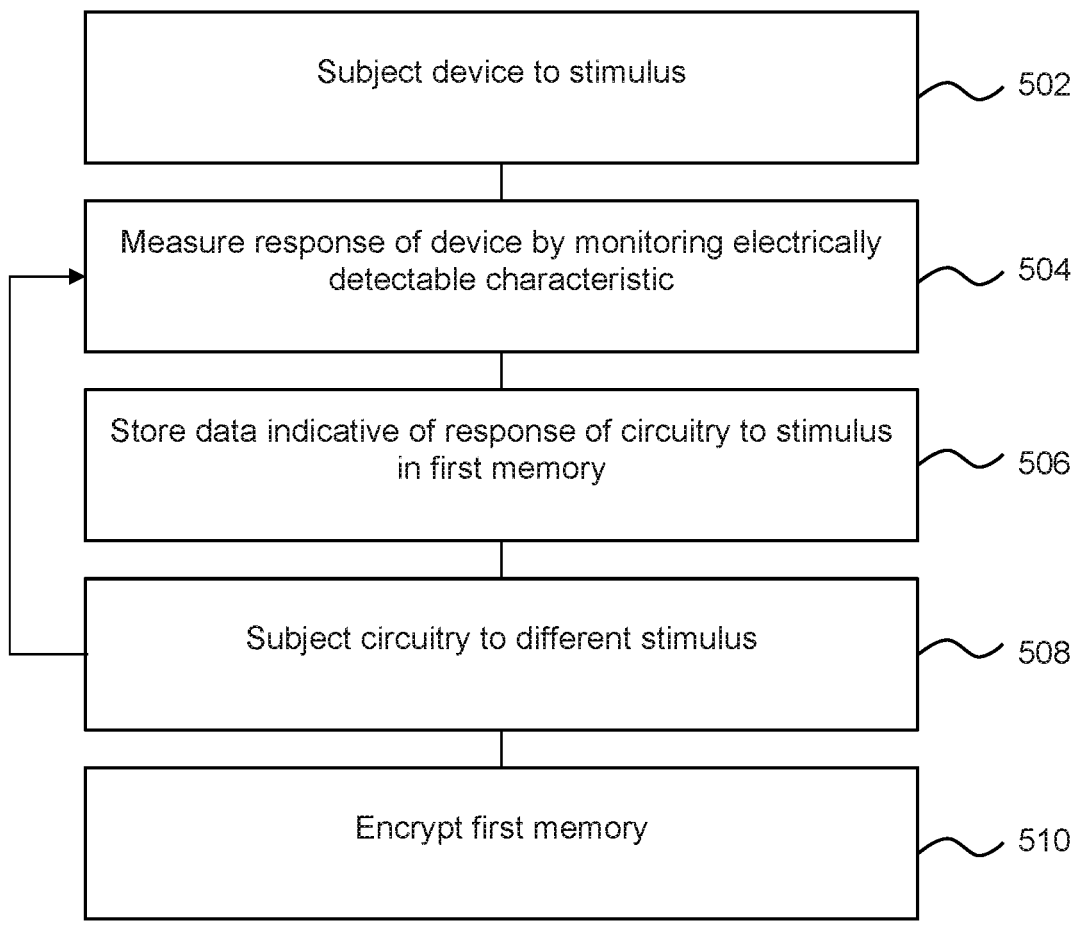
FIG. 5 is an example of a method for measuring a response to a stimulus.

FIG. 5 is an example of a method which may comprise a method of carrying out block 104 of FIG. 1. In this example, block 502 comprises subjecting the device to a stimulus, block 504 comprises measuring the response of the device to the stimulus by monitoring the electrically detectable characteristic and block 506 comprises storing data indicative of the response of the circuitry to the stimulus in the first memory. Block 508 comprises subjecting the circuitry to a different stimulus, following which blocks 504 and 506 are repeated. In some cases, the conditions under which the stimulus is applied (e.g. whether a validation device is submerged in a fluid, or in air), may be altered as well as or instead of the stimulus.

Once the data is stored, the method further comprises, in block 510, applying a cryptographic process to at least a portion of the first memory. This may comprise 'signing' the data, and/or encrypting the data. The memory portion may comprise the data indicative of the response of the device.

Figure 6:
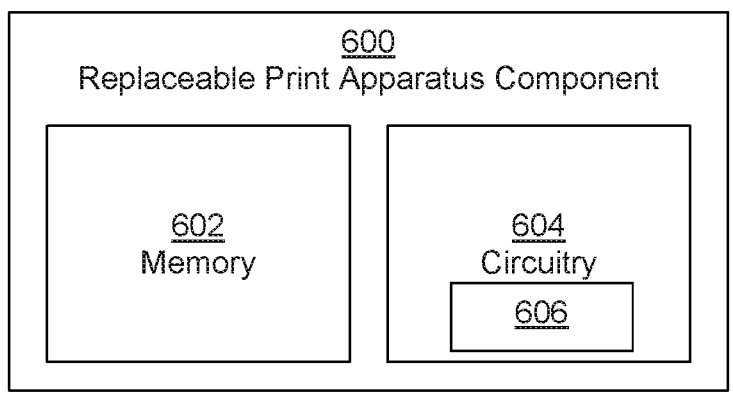
FIGS. 6 and 7 show examples of replaceable print apparatus components.

FIG. 6 is an example of a replaceable print apparatus component 600 comprising a memory 602, and circuitry 604 comprising a validation device 606. An electrical characteristic of the circuitry 604 is variable in response to a stimulus applied to the replaceable print apparatus component 600 which displaces at least part of the validation device 606, and the memory 602 stores measured data characteristic of an expected response of the circuitry 604 to the stimulus, in some examples as associated with a given status such as an ink level.

Figure 7:
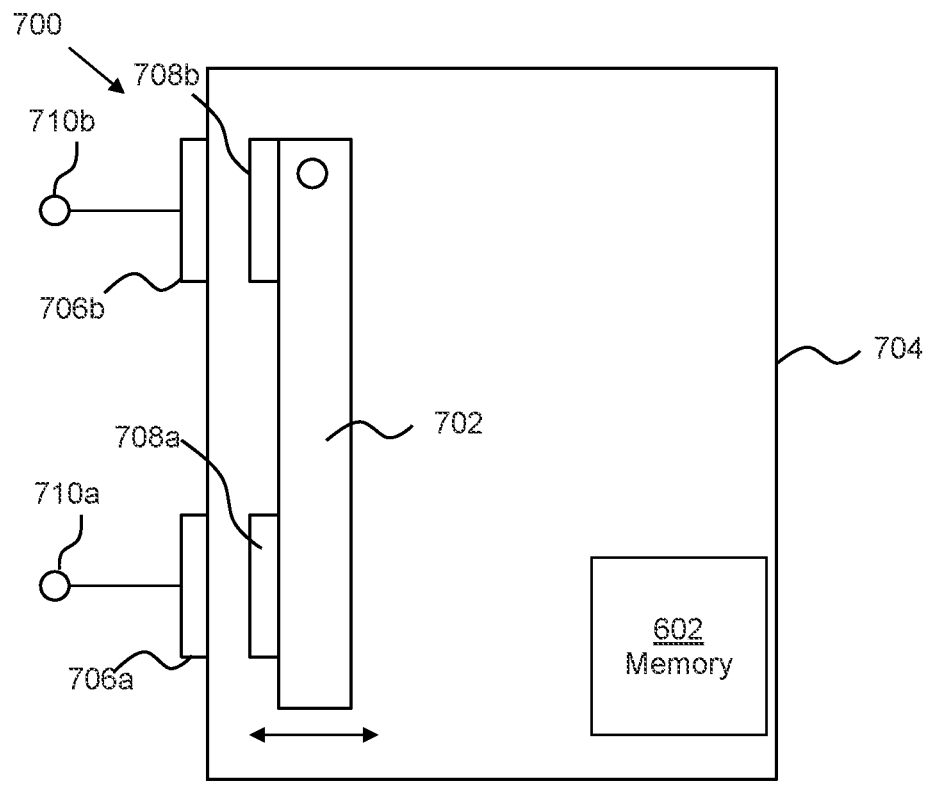

FIG. 7 is an example of a replaceable print apparatus component 700, in this case comprising a print agent container. Components in common with FIG. 6 are labelled with like numbers. The validation device in this example comprises a fluid level sensor 702 having characteristic resonant behaviour in air, one end of which is free to move, and the other end is fixed.

The replaceable print apparatus component 700 comprises a housing 704, the housing 704 having a first electrical connection 706a disposed on an outer surface thereof, for example in the form of an electrically conductive contact pad or plate. A second electrical connection 708a is provided on a free end of the fluid level sensor 702, which is disposed inside the housing 704. In this example, a similar arrangement of electrical connections 706b, 708b is seen at the fixed end (although in other examples there may be a galvanic connection formed through the housing 704). The first and second electrical connections 706, 708 are capacitively coupled via the housing 704.

This may provide a part of a circuit comprising a variable capacitor provided by the spaced electrical connections 706a, 708a, which varies when the free end of the fluid level sensor 702 is caused to move, for example when an impulse is applied to the component 700, and a non-variable capacitor provided by the spaced electrical connections 706b, 708b at the fixed end of the sensor 702. An electrical connection may be provided between the variable and non-variable capacitor via the material of the sensor 702, or via an electrical connection provided thereon or therein.

The capacitance of the variable capacitor will vary depending on the relative spacing of the electrical connections 706, 708, and may be detected by connected sensing circuitry to the terminals 710a, 710b (wherein the connection may be capacitive or galvanic), which may for example monitor the voltage and current of the circuit, and which may detect the frequency and/or magnitude of the variance in the capacitance and the like.

In the 'two arm' embodiments discussed above, two such circuits may be provided, and/or the 'variable capacitors' provided by the vibrating paddles may be included in a single circuit (and electrically linked, for example via the material of the validation devices or an electrical connection provided thereon). In examples in which the arms have different natural or resonant frequencies (be that by placement of a mass, and/or due to the form and/or materials thereof), the response of the arms may be readily distinguishable even when the arms are connected in series to a single sensing circuit, as the response will have characteristics of both frequencies. In other examples, the arms may have the same natural frequency, and the strength of the response signal could be utilized to determine if just one or both arms was responding at its resonant frequency or exhibiting other behaviour.

Figure 8:
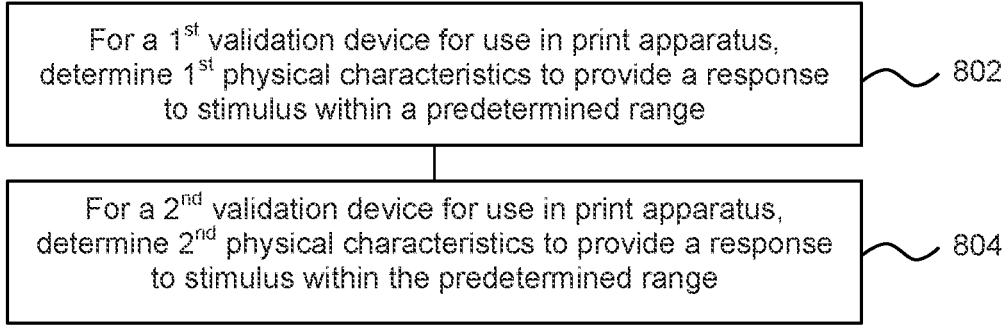
FIG. 8 is another example of a method of determining physical characteristics for validation devices.

FIG. 8 is an example of a method comprising, in block 802, for a first validation device for use in print apparatus, determining first physical characteristics to provide a response to stimulus within a predetermined range. Block 804 comprises, for a second validation device for use in print apparatus components, determining second physical characteristics to provide a response to stimulus within the predetermined range. For example, the stimulus may be a mechanical or inertial stimulus (for example stopping or starting movement of a component containing the validation device), or may comprise an electrical or magnetic stimulus. The stimulus may, when applied, displace at least part of the validation device.

In other words, according to the method of FIG. 8, for each of a plurality of validation devices for use in print apparatus components, the method comprises determining different physical characteristics for the validation devices, wherein the physical characteristics are determined to provide a response to stimulus within a predetermined range.

This may comprise a varying at least one of a length of at least a portion of a validation device (in some examples, within a range of possible lengths), a material of at least a portion of the first validation device; a width of at least a portion of the first validation device (in some examples, within a range of possible widths); a position of a mass for attachment to the first validation device, a size of a cut-out portion in the first validation device, or the like.

In some examples, the validation device may comprise a vibrating, oscillating or resonant member.

The range of the response may for example be a frequency range of resonant behaviour. In some examples, this may be a range of up to 100, or up to a few hundred Hertz. As discussed above, changes in capacitance at such frequencies may be within the detection range of standard sensing apparatus, detectable without excessive processing resource and/or practical for the sake of material selection and dimensions. In other examples, the range may comprise a range in capacitance.

As has been noted above, by varying the characteristics of the validation device, this may improve the security of methods for verifying the authenticity of a print apparatus component.

Examples in the present disclosure can be provided, at least in part, as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that flows in the flow charts, in particular the flowcharts of FIGS. 3 and 8, as well as combinations of the flows therein can be realized by machine readable instructions. Such machine readable instructions may also be used for encryption and decryption in carrying out the method set out herein.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices (for example processes connected to the memory 602 or processing apparatus provided in a print apparatus) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
   fabricating a first validation device for association with a first replaceable print apparatus component, wherein the first validation device is to form part of circuitry arranged on the first replaceable print apparatus component and provides an associated electrically detectable characteristic that varies with a position of at least part of the first validation device;
   measuring the electrically detectable characteristic, to generate data indicative of the electrically detectable characteristic;
   storing the data indicative of the electrically detectable characteristic in a first memory; and
   assembling the first replaceable print apparatus component comprising the first validation device and the first memory storing the data indicative of the electrically detectable characteristic.

2. The method of claim 1, further comprising determining first physical characteristics for the first validation device.

3. The method of claim 2, wherein determining the first physical characteristics comprises at least one of: determining a length of at least a portion of the first validation device, selecting a material and/or material property of at least a portion of the first validation device; determining a width of at least a portion of the first validation device; selecting a position of a mass for attachment to the first validation device; or determining a size of a cut-out portion in the first validation device.

4. The method of claim 2, further comprising:
   determining second physical characteristics for a second validation device, wherein the second physical characteristics are different from the first physical characteristics;
   fabricating the second validation device for association with a second replaceable print apparatus component, wherein the second validation device is to form part of circuitry arranged on the second replaceable print apparatus component that provides an associated electrically detectable characteristic that varies with a position of at least part of the second validation device;
   measuring the electrically detectable characteristic of the circuitry of the second replaceable print apparatus component;
   storing data indicative of the electrically detectable characteristic of the circuitry of the second replaceable print apparatus component in a second memory; and
   assembling the second replaceable print apparatus component comprising the second validation device and the second memory.

5. The method of claim 1, wherein measuring the electrically detectable characteristic comprises determining a capacitance of the circuitry.

6. The method of claim 1, wherein the first validation device comprises a resonant member, and the method comprises determining, from the measurement of the electrically detectable characteristic, at least one of: a resonant frequency of the first validation device, a decay rate of a resonant response of the first validation device, or a capacitive signature of the first validation device.

7. The method of claim 1, wherein measuring the electrically detectable characteristic is carried out after the assembling of the first replaceable print apparatus component.

8. The method of claim 1, comprising subjecting the circuitry to a stimulus and measuring a response of the circuitry to the stimulus by monitoring the electrically detectable characteristic.

9. The method of claim 8, comprising:
   subjecting the circuitry to a plurality of stimuli;
   measuring a response of the circuitry to each stimulus of the plurality of stimuli; and
   storing, in the first memory, data indicative of the response of the circuitry to each stimulus of the plurality of stimuli.

10. The method of claim 1, further comprising applying a cryptographic process to at least a portion of the first memory.

11. A replaceable print apparatus component comprising:
    a memory and circuitry comprising a validation device, wherein an electrical characteristic of the circuitry is variable in response to a stimulus applied to the replaceable print apparatus component that displaces at least part of the validation device, and the memory stores measured data generated based on a response of the circuitry to the stimulus.

12. The replaceable print apparatus component of claim 11, further comprising;
a print agent container, wherein the validation device comprises a fluid level sensor having a characteristic resonant behavior in air.

13. The replaceable print apparatus component of claim 11, further comprising:
a housing having a first electrical connection disposed on an outer surface of the housing, and a second electrical connection disposed inside the housing, wherein the first and second electrical connections are capacitively coupled via the housing, and the second electrical connection is provided on the validation device.

14. The replaceable print apparatus component of claim 11, wherein the validation device comprises a vibrating member to vibrate in response to the stimulus.

15. The replaceable print apparatus component of claim 11, wherein the stimulus comprises a motion imparted on the replaceable print apparatus component.

16. The replaceable print apparatus component of claim 11, wherein the validation device comprises a fluid level sensor.

17. The replaceable print apparatus component of claim 11, wherein the measured data stored in the memory comprises a capacitance of the circuitry.

18. The replaceable print apparatus component of claim 11, wherein the validation device comprises a resonant member, and wherein the measured data stored in the memory is indicative of one of: a resonant frequency of the validation device, a decay rate of a resonant response of the validation device, or a capacitive signature of the validation device.

* * * * *